3,084,024
CHEMICAL SMOG CONTROL

William F. Hamilton, Altadena, and Myron Levine and Eli Simon, Los Angeles, Calif., assignors to Lockheed Aircraft Corporation, Burbank, Calif.
No Drawing. Filed Nov. 19, 1959, Ser. No. 854,015
4 Claims. (Cl. 23—4)

This invention relates generally to air pollution control and more particularly to methods and means for chemically inhibiting the formation of irritants in the air such as those which result from photo-chemical reactions in polluted air.

Certain air pollutants which are often present in stagnant or stratified air, can interact with one another under the influence of sunlight to form various types of noxious products. This phenomenon is commonly associated with industrial and relatively populated areas and is enhanced by topographical and meteorological conditions resulting in the formation of a layer of hot compressed air known as a temperature inversion which does not allow the pollutants to rise and escape. It is ascribable to relatively high hydrocarbon content in the presence of oxides of nitrogen and their reaction products.

The term "polluted air," as used herein, means atmospheric air containing hydrocarbons, oxides of nitrogen and their reaction products. These types of materials react photochemically to produce irritating invisible gases and aerosols commonly known as "smog." At the present time there are no practical methods known for eliminating, substantially reducing or acceptably controlling this smog.

The exact mechanism of smog formation and the roles of the pollutants still remain somewhat obscure. Basic research indicates that eye irritation and plant damage commonly associated with smog result from unstable intermediate products thought to be ozone and organic peroxides produced by the photochemical action of sunlight on nitrogen dioxide in the presence of hydrocarbons. These substances are initially typically introduced into the atmosphere as a result of incomplete combustion and evaporation of automotive fuels and the like.

The principal object of this invention is to inhibit by chemical reaction the formation of the irritating secondary products which constitute smog. The reactions brought about in accordance with these teachings are equally potent against the effects of hydrocarbons introduced into the air from all sources, including the combustion of fuel oil and the evaporation of gasoline and solvents.

Another object of this invention is to provide a new composition of matter, which is a mixture of potentially smog forming polluted air and an inhibitor which reacts with the pollutants and their reaction products to prevent or materially reduce smog formation.

Another object of this invention is to provide potent chemical means for inhibiting the formation of smog which may be used effectively in sufficiently low concentrations as not to be injurious to plant or animal life.

Another object of this invention is to provide means for inhibiting the formation of smog which is economical and which may be introduced into polluted air in a number of different ways with highly effective results.

Further and other objects of this invention will become apparent from a reading of the following detail description, especially when considered in combination with the accompanying reaction formulas.

Specifically, the chemical reactions which give rise to smog may be considered as a series of interdependent, photochemical chain reactions which are illustrated by the following formulas:

$$NO_2 + h\nu \longrightarrow NO + (O) \quad (1)$$
(Nitrogen dioxide) (Active atomic oxygen)

$$\underset{R''}{\overset{R'}{>}}CH_2 + (O) \longrightarrow \underset{R''}{\overset{R'}{>}}C=O \quad (2)$$
(Hydrocarbons) (Aldehydes and ketones)

where $R'$ and $R''$ are hydrogen or hydrocarbon radicals and $h\nu$ represents activating radiation.

$$\underset{R''}{\overset{R'}{>}}C=O + (O) \longrightarrow \underset{R''}{\overset{R'}{>}}C\overset{O}{\underset{O}{\diagdown\diagup}} \quad (3)$$
(Peroxides)

$$\underset{R''}{\overset{R'}{>}}C\overset{O}{\underset{O}{\diagdown\diagup}} + O_2 \longrightarrow \underset{R''}{\overset{R'}{>}}C=O + O_3 \quad (4)$$
(Ozone)

$$O_3 \longrightarrow O_2 + (O) \quad (5)$$
To reaction 2

The above reactions have been simplified to indicate the type of events which take place. Other reactions undoubtedly occur, for example unsaturated hydrocarbons form peroxides and ozonides directly, without forming the intermediate oxidation products; free radicals can form; the oxides of nitrogen can react directly with olefins and intermediate oxidation products to form nitrites and peroxyacyl nitrites. However, the general explanation of smog formation is still valid.

It is seen that if the chain of reactions is impeded or broken at any particular point, the formation of irritants will also be impeded or stopped. For example, if oxidation of the hydrocarbons is prevented by removal of the oxidants responsible, such as ozone or nascent oxygen, the irritating peroxides, hydroperoxides and similar compounds will not be formed. These materials are unstable and decompose so that if their formation is inhibited, their concentration in the atmosphere decreases.

Still referring to the above reactions, it is evident that if the aldehydes, ketones or other partially oxidized products formed from the hydrocarbons are removed from the scene of the reaction, the irritants will likewise be minimized or precluded.

Referring still further to the above reactions, it can be inferred that by directing the path of free radical reaction such as to cause them to recombine harmlessly the formation of irritants will also be avoided.

Similarly, since nitrogen dioxide is a precursor of the chain reactions, its removal would likewise effectively suppress irritant formation.

The inhibiting of the formation of irritants is accomplished according to this invention by the addition of small amounts of selected materials which have the desired activity in the polluted atmosphere. Typical of these materials are halogens, amines, hydroquinones and related compounds.

It is probable that the halogens act by combined catalytic photochemical reactions resulting in the removal of oxidants responsible for and contributing to irritant formation through other secondary reactions as follows:

$$X_2 \xrightarrow{h\nu} 2X \quad (6)$$
$$X + O_3 \rightarrow XO_3 \quad (7)$$
$$XO_3 + O_3 \rightarrow XO_2 + 2O_2 \quad (8)$$
$$XO_2 + O_3 \rightarrow XO_3 + O_2 \quad (9)$$
$$XO_3 + XO_3 \rightarrow X_2 + 3O_2 \quad (10)$$

where
$X$ = chlorine, bromine or iodine
$h\nu$ = activating radiation

The amines may act by both combining with partially oxidized products and with oxides of nitrogen thus rendering them inactive or effectively removing them from the field of reaction. This is illustrated by the following reactions of amines with aldehydes and ketones:

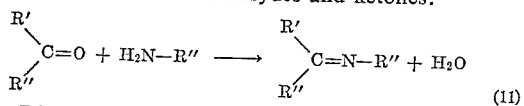

(11)

where R′ and R″ are hydrogen or hydrocarbon radicals, and with nitrogen dioxide:

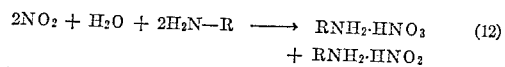

(12)

The hydroquinones may break the reaction chain by removing or bringing about the recombination of free radicals responsible for chain continuity.

Experimental work on smog control for the purpose of this invention has been carried out by using synthetic mixtures capable of producing ozone and irritants when mixed with air and irradiated as well as by using exhaust gas from internal combustion engines, mixing it with air, and irradiating. Pyrex glass flasks, fifty liters capacity, closed with ground glass covers, and each subjected to radiation from four 400 watt mercury lamps symmetrically placed within a few inches of the flask, were used for preliminary evaluations and small scale experiments. It was found that if the exhaust gases were diluted 1:1000 with air in the flasks, and if they were subjected to the radiation for about an hour and a half, that smog would be generated which was comparable with that observed in the Los Angeles basin, for example, on a typically smoggy day. The amount of smog generated in the flasks was estimated by using an ozone photometer to measure the amount of ozone formed as the reactions progressed.

Larger scale experiments were conducted in a radiation chamber constructed of aluminum and thin transparent plastic sheeting. This chamber had a capacity of 500 cu. ft., and was made with the floor and one wall of aluminum, with a light aluminum frame for the support of the plastic used for the other three walls and ceiling. "Cellophane," a film produced from regenerated cellulose, or "Mylar," a polyester film made by Du Pont, in thicknesses approximating 1–2 mils, were found suitable for use as the plastic, as either of them transmitted sufficient sunlight to cause smog generation within the chamber. When this chamber was charged with air containing suitable synthetic smog forming pollutants or exhaust gas, and when it was exposed to bright sunlight, smog formed which was comparable to that generated in the flasks and in the Los Angeles basin. The chamber had the advantage that human beings could enter and remain in test atmospheres, and that they could thus judge the extent of irritation encountered under varying test conditions. Because of its relative size, it also served as an intermediate apparatus to enable translation of the results obtained in flasks to those which would be obtained in the open atmosphere. Generally, polluted air mixtures behaved the same, whether subjected to artificial radiation through the glass walls of the flasks or to sunlight through the plastic walls of the chamber. Polluting the chamber air with ½ cu. ft. (1:1000) of exhaust gas produced ozone levels after bright sunlight irradiation on the order of magnitude of 0.4 to 0.8 part per million (p.p.m.) in about the same time as did 50 ml. of exhaust gas introduced into the flasks and artificially radiated. Unless otherwise stated, all concentrations hereinafter given are by volume at ambient temperature and pressure.

The usual method of evaluating the effect of various substances on smog formation was to start with the flasks, which were carefully purged with air which had been previously dried over silica gel to remove excess humidity, and from which hydrocarbon traces had been removed by activated carbon. The ozone content of the air was then measured, and purging continued until the flask air contained not more than 0.01 to 0.03 p.p.m. of ozone. The pollutants were then introduced in measured amounts by means of hypodermic syringes. In the case of exhaust gas, 50 ml. was injected with the flask under a very slight vacuum to insure flow of the pollutant into the flask. The glass valves of the flask cover were then closed, and the mercury lamps turned on. After being irradiated for a known time, usually 1½ hours, the contents of the flask were analyzed for ozone concentration.

The ozone measuring instrument is an ultraviolet photometer which operates on the principle of selective absorption by ozone of light at a wave length of 253.7 millimicrons. The instrument utilizes a double beam for measuring the light absorption of a gas mixture containing ozone in comparison with the same mixture from which the ozone has been removed by exposure to a manganese dioxide catalyst. For a particular gas mixture, the zero of the instrument is adjusted and the difference of the light absorbed in the double beam comparison is therefore due only to the ozone content. The accuracy of the instrument approximates 2% of the full scale deflection—or 2 parts per hundred million (p.p.h.m.) of ozone in the gas mixture.

After evaluation in the flasks, the polluted mixtures and additives, if indicated, were reevaluated in the chamber by the same process, with the same proportions of ingredients. The additional checking of the results obtained served to verify the validity of previous data, and in case of results which were not entirely delineated as to exact proportions, the added accuracy inherent in the mixture of larger volumes, and the ability to continuously measure the ozone level in the mixture, served to more precisely define the limits of effectiveness of the additives.

It was discovered and verified by the test procedures outlined above that iodine vapor is the halogen reagent of choice for either the prevention of smog formation or the snuffing of ozone and irritant formation after smog has been generated. This material is capable of reducing the ozone content of polluted air in which smog has generated by irradiation by as much as 95% when it is introduced in proportions approximating one volume in ten million volumes of irradiated polluted air. Its effect is additive. For example, in polluted air containing smog, the addition of 3.5 parts per hundred million will reduce the ozone content about one third; the addition of another 3.5 p.p.h.m. of iodine vapor will reduce the ozone content by an almost equal amount; a third similar addition will act similarly and the total diminution of ozone will approximate that which would have occurred if 0.1 p.p.m. had been introduced at one time. The additive effect, and the fact there is no threshold value which must be exceeded before the reagent becomes effective is of great importance in the treatment of polluted irradiated air.

After pollution, but before irradiation, the addition of 0.1 p.p.m. of iodine vapor for example, will almost entirely prevent the generation of ozone. This effect can persist for hours depending largely upon the test conditions.

Other halogens, when added to polluted air in which smog has formed, have an effect similar to that of iodine. Bromine when tested in the radiation chamber, was about ⅓ as effective as iodine, and its effect was similarly additive; chlorine, in turn was only about ⅕ as effective as bromine, and its effect was also additive.

Iodine pentoxide is a solid with a very low vapor pressure. When tested in the flasks, it was not effective unless it was heated. This presumably increased its vapor pressure so that small amounts of it went into the gaseous phase. Under this circumstance, it inhibited the formation of ozone to a marked degree.

Iodoform, $CHI_3$, is very effective in either preventing smog formation in polluted air, or in abating the smog after it has formed. Like iodine, its effect is additive, and there does not appear to be a threshold value below which it is ineffective. In the 500 cu. ft. radiation chamber containing polluted irradiated air with an ozone content of 0.76 p.p.m., the addition of 3 mg. of iodoform (1.4 p.p.h.m.) resulted in a decrease of ozone to 0.55 p.p.m.; another 3 mg. reduced it to 0.39, and so forth. Thus it appears that any organic or inorganic halogen compound in which the atomic weight of the halogen is between 30 and 140 and which acts like the free halogen in the polluted air will be capable of preventing or reducing smog formation.

It was also discovered that volatile amines especially those having a molecular weight between approximately 31 and 150, when added to polluted air, are capable of reducing the ozone content of the irradiated mixture at least 80% or more. Triethylamine, for example, at a concentration approximating 4 p.p.m. by volume inhibited ozone formation from exhaust gas pollutant to the extent that only about 10–25% of the expected ozone formed; at a concentration of 2.5 p.p.m. the inhibition was less, but for some mixtures was almost proportional to that caused by 4 p.p.m. Monomethylamine acted similarly, but at 4 p.p.m. it was not as effective as triethylamine. For example, with a particular polluted air mixture which generated approximately 0.57 p.p.m. ozone in the flasks, the addition of 4 p.p.m. triethylamine held the ozone formation down to 0.06 p.p.m., whereas comparably the monomethylamine addition resulted in 0.22 p.p.m. ozone formation.

Hydroquinone (para-dihydroxybenzene) when added to air polluted with exhaust gas in the radiation chamber, effectively reduced the ozone formation caused by irradiation with sunlight. For example, a typically polluted chamber atmosphere containing 0.5 cu. ft. of exhaust gas built up a maximum of 0.60 p.p.m. ozone when exposed to sunlight; the addition of 0.56 gram (8 p.p.m.) of hydroquinone in 20 ml. water sprayed into an identical polluted atmosphere cut down the maximum ozone formation to 0.20 p.p.m.

While we do not intend or wish to be restricted or limited in any way with respect to any particular theory of operation of the materials of this invention, it appears that when halogens are added to polluted air capable of forming or containing smog, they act as inhibitors for photochemical ozone and irritant formation, as positive accelerators for ozone and peroxide decomposition, and that they will not remain in gaseous elemental form indefinitely, but probably eventually become inactivated by forming relatively stable halides with the organic matter present. The catalytic actions probably occur within a few minutes, but the halide formation is much slower, requiring hours for completion.

The action of the amines is probably different, and larger proportions are required for comparable effectiveness. They may react by forming relatively stable compounds such as aldoximes and ketoximes with the partly oxidized hydrocarbons, preventing formation of irritants or diminishing their concentration. Also, they may react with and remove oxides of nitrogen from the mixture thus breaking the reaction chain which is postulated. Or again, they may become partially oxidized in the mixture, preferentially preventing irritant and ozone formation, or accelerating their decomposition.

Hydroquinones may act in a different manner, as postulated previously, by reacting with free radicals formed photochemically and removing them from the field of the reaction as relatively more stable compounds.

The following are specific examples setting forth the results obtained by utilizing the teachings of the invention for chemically inhibiting the formation of smog:

*Example 1*

500 cu. ft. of air in a transparent enclosure was polluted with 0.5 cu. ft. of exhaust gas from an internal combustion engine. Before being subjected to sunlight a shallow glass container containing about 12 milligrams of solid iodine was placed on an electric hot plate in the enclosure. Current was thereafter applied to the plate causing purple iodine vapor to be diffused into the atmosphere in the enclosure as the crystals became warm. When bright sunlight was allowed to fall upon the chamber, the ozone content remained low, on the order of 0.10 p.p.m. or less, and irritants were not noticed. Persons entering the enclosed chamber pronounced it free of irritating smog.

*Example 2*

500 cu. ft. of air was polluted in a transparent enclosure by adding 0.5 cu. ft. of automobile exhaust gas. The mixture was allowed to generate smog by exposing the enclosure to bright sunlight for several hours. When the ozone content of the atmosphere reached 0.5 p.p.m. or more, an open glass container containing about 12 milligrams of iodine was introduced and vaporized by setting the container on a warm electric hot plate in the enclosure. As the iodine vaporized, the ozone content of the polluted air diminished rapidly, by as much as 80–90% of its original value, and persons entering the chamber found the atmosphere non-irritating. It remained so for hours, even though the chamber was still radiated.

*Example 3*

500 cu. ft. of air in a transparent enclosure was polluted with 0.5 cu. ft. of exhaust gas from an internal combustion engine. Next, 1 p.p.m. by volume of nitrogen dioxide was introduced to provide a heavy concentration of smog producing ingredients. Then a shallow glass container containing about 12 milligrams of solid iodine was placed in the enclosure on an electric hot plate. Current was thereafter applied to the plate causing purple iodine vapor to be diffused into the atmosphere in the enclosure as the crystals became warm. When bright sunlight was allowed to fall upon the enclosure, the ozone content remained low, of the order of 0.10 p.p.m. or less, and irritants were not noticed. Persons entering the enclosed chamber pronounced it free of irritating smog.

*Example 4*

500 cu. ft. of air in a transparent enclosure was polluted with 0.5 cu. ft. of automobile exhaust gas and 1 p.p.m. of nitrogen dioxide. The mixture was allowed to generate smog by exposing the enclosure to bright sunlight. When the ozone content of the atmosphere reached 0.5 p.p.m., or more, an open glass container containing about 12 milligrams of iodine was introduced and vaporized by setting the container on a warm electric hot plate in the enclosure. As the iodine vaporized, the ozone content of the polluted air diminished rapidly, by as much as 80–90% of its original value, and persons entering the chamber found the atmosphere non-irritating. It remained so for hours, even though the chamber was still radiated.

*Example 5*

500 cu. ft. of air in a transparent enclosure was polluted by adding 14 ml. of gaseous pentene-1 and 8.5 ml. of gaseous commercial nitrogen dioxide, using hypodermic syringes. The air thus contained on a volume basis approximately 1 p.p.m. of pentene-1 and 1 p.p.m. of nitrogen dioxide. After the ozone content of the polluted air approximated 0.5 p.p.m. from irradiation with bright sunlight, about 12 mg. of solid iodine was introduced into the enclosure in a shallow open glass container. The container was placed on a hot plate in the enclosure chamber to speed the rate of evaporation of the solid. Within about ten minutes after the evaporation of the iodine, the ozone content decreased to about 0.1 p.p.m.

*Example 6*

500 cu. ft. of air in a transparent enclosure was polluted with artificial smog forming impurities by introducing 14 ml. gaseous pentene-1 and 12.8 ml. of gaseous commercial nitrogen dioxide using hypodermic syringes. The concentration of the pollutants thus approximated 1 p.p.m. of hydrocarbon and 1.5 p.p.m. of nitrogen dioxide. After being exposed to bright sunlight for several hours, the ozone concentration built up to 0.61 p.p.m. whereupon 1.4 ml. of gaseous bromine (.1 p.p.m.) was introduced using syringes in five equal increments. The ozone concentration incrementally diminished over a period of ¾ hour to 0.48 p.p.m. A single additional 1.4 ml. of the gaseous bromine caused a further reduction of the ozone content to 0.38 p.p.m. in about 15 minutes.

*Example 7*

500 cu. ft. of air in a transparent enclosure was polluted with 1 p.p.m. of pentene-1 and 1 p.p.m. of nitrogen dioxide, by introducing 14 ml. of pentene-1 and 8.5 ml. of commercial nitrogen dioxide from hypodermic syringes. The enclosure was irradiated in bright sunlight and after about 4 hours, the ozone content was almost constant, 0.53 p.p.m. At this time 1.4 ml. of chlorine (0.1 p.p.m.) was added, and within five minutes the ozone concentration was 0.50 p.p.m. The addition of 7 ml. more chlorine (0.5 p.p.m.) resulted in a reduction of ozone to 0.41 within ½ hour.

*Example 8*

To 500 cu. ft. of air in a transparent enclosure, ½ cu. ft. of exhaust gas from an idling automobile engine, and 8.5 ml. of commercial nitrogen dioxide were added as pollutants. The concentration of exhaust gas was 1:1000 and of the nitrogen dioxide was 1 p.p.m. After 1½ hours in bright sunlight, the ozone concentration was 0.76 p.p.m. At this time, 3 mg. of crystalline iodoform ($CHI_3$) was introduced, and vaporized by means of an electric hot plate. The ozone concentration diminished rapidly to 0.55 p.p.m. and the iodoform vapor causing this was only present at a concentration of 1.4 p.p.h.m. Three successive 3 mg. additions rapidly reduced the ozone concentrations to 0.39, 0.30 and 0.24 p.p.m. respectively.

*Example 9*

500 cu. ft. of air in a transparent chamber was polluted with 0.5 cu. ft. of exhaust gas from an internal combustion engine, and exposed to bright sunshine. In 3½ hours, the ozone content had increased to 0.60 p.p.m. The chamber was then opened, ventilated thoroughly with atmospheric air, containing 0.04 p.p.m. ozone, which was again polluted with 0.5 cu. ft. of exhaust gas from the same engine under identical operating conditions. Next, 150 ml. of an aqueous solution containing 0.56 gram of hydroquinone was sprayed into the chamber, and it was again exposed to bright sunlight for 3½ hours. During this time the ozone concentration in the chamber had not exceeded 0.11 p.p.m.

*Example 10*

500 cu. ft. of atmospheric air in a transparent enclosure was polluted by the addition of 1 p.p.m. of pentene-1 and 1 p.p.m. of nitrogen dioxide, by adding 14 ml. of the gaseous hydrocarbon and 8.5 ml. of commercial nitrogen dioxide from hypodermic syringes. After two hours of sunlight exposure, the ozone content of the air in the enclosure was 0.66 p.p.m. 56 ml. of gaseous commercial methylamine (4 p.p.m.) was then introduced from a hypodermic syringe, and the ozone content of the irradiated polluted air gradually decreased to 0.26 p.p.m. in about 1½ hours.

*Example 11*

Atmospheric air in a closed 50 litre Pyrex glass flask was polluted by the addition of 50 ml. of exhaust gas from an internal combustion gasoline engine. A small amount (0.005 gram) of oxide pentoxide, on a glass tray, had been placed inside on the bottom of the flask before adding the exhaust gas. The flask was then intensely irradiated for 1½ hours by four 400 watt mercury lamps disposed symmetrically within two inches of the flask walls. One of the lamps was adjusted so that it heated the iodine pentoxide by shining directly on it. At the end of the test, the ozone concentration in the flask was 0.10 p.p.m. An identical set-up, used for a contrast, containing air identically polluted but without the iodine pentoxide, had an ozone concentration of 0.54 p.p.m. at the end of the 1½ hour irradiation.

*Example 12*

A 50 litre Pyrex glass flask, closed by means of a ground glass cover plate, containing atmospheric air polluted by the addition of 50 ml. of gasoline engine exhaust gas, was treated by the addition of 4 p.p.m. gaseous triethylamine. An identical flask, similarly polluted, but without the amine, was used for a control. Both flasks were irradiated for 1½ hours with four symmetrically disposed 400 watt mercury lamps placed within two inches of the walls of the flasks. At the end of the test period, the ozone content of the control flask was 0.38 p.p.m. while that of the flask containing the triethylamine was 0.08 p.p.m.

*Example 13*

Atmospheric air was dried and purified by passing it over silica gel and activated carbon, and was then passed into three identical 50 liter flasks. After thorough purging, the flow was shut off and the flasks were closed. The clean, dry air in all the flasks was then polluted by the addition of 1 p.p.m. of nitrogen dioxide and 1 p.p.m. of pentene-1. Nothing else was added to the first flask which served as a control; to the second 2 p.p.m. of isopropylamine was added, and to the third, 4 p.p.m. of isopropylamine. All flasks were then identically irradiated by four 400 watt mercury lamps for 1½ hours. At the end of this time, the ozone content of the control flask was 1.12 p.p.m.; the second was 0.66 p.p.m., and the third was 0.21 p.p.m.

*Example 14*

The procedure is identical with that of Example 12, except that 1 p.p.m. of gaseous N-methyl morpholine was introduced into one of the flasks instead of triethylamine. At the end of the test period, the ozone content of the control flask was 0.38 p.p.m., whereas the one containing the N-methyl morpholine was 0.25 p.p.m.

*Example 15*

The procedure is identical with that of Example 12, except that 1 p.p.m. of trimethylamine was introduced in place of the triethylamine. After irradiation, the ozone content of the control flask of the irradiation was 0.36 p.p.m. whereas with the trimethylamine the concentration was 0.16 p.p.m.

*Example 16*

Two 50 litre Pyrex flasks were purged with air enriched with ozone, to oxidize any impurities on the walls. The flasks were then blown with purified air to remove the ozone. 50 ml. of exhaust gas was then added to each flask, and 2 p.p.m. of di-n-propylamine was added to only one of the flasks. After irradiation for one and one-half hours the ozone content of the control flask was 0.60 p.p.m. whereas that of the flask containing the amine was 0.31 p.p.m.

As previously indicated, iodine is the material of choice in carrying out the invention because of its inherent potency in abating or preventing the formation of smog in polluted air. For almost complete reduction of ozone and irritants in concentrations typical of Los Angeles smog, only about one volume of iodine vapor is required in ten million volumes of the air. Lesser amounts are effective, and the extent of the effect is dependent upon and roughly proportional to the concentrations of iodine and pollutants. There is apparently no threshold concentration which must be reached before the iodine vapor is effective. The minute quantities required are at present favorable economically. The extended duration of its effect, the fact that it is required in concentrations below its toxic threshold, its non-irritating properties at this concentration, and its relatively innocuous fate after smog abatement are other reasons for its preference.

It is evident that the small concentrations of smog inhibiting materials required may be introduced into polluted air and distributed in a number of different ways, such as by aircraft, by use of stationery blowers located at strategic places, by the natural evaporation of the inhibiting material such as iodine from pads or containers attached to motor vehicles, by making use of prevailing winds or the like. The material is simply introduced to the polluted air to intermix and react with the pollutants and any suitable means for doing this may be employed without departing from the teachings of this invention.

It should be understood that the invention is not to be limited by the theories and procedures which are discussed. These details are given only by way of illustration and to aid in clarifying the invention. They are not regarded as essential to the invention except insofar as they are expressed by way of limitation in the following claims which are intended to cover the invention as broadly as the prior art will allow.

We claim:

1. The method of inhibiting photochemical reactions which produce irritating gases and aerosols in air polluted with hydrocarbons, oxides of nitrogen and their reaction products including ozone comprising, introducing iodine to the polluted air to react with the ozone to suppress the ozone and thereby block the photochemical reactions.

2. The method of inhibiting photochemical reactions which produce irritating gases and aerosols in air polluted with hydrocarbons, oxides of nitrogen and their reaction products including ozone comprising, introducing to the polluted air a material selected from the group consisting of iodine, bromine and chlorine to react with ozone to suppress the ozone and thereby block the photochemical reactions.

3. The method of suppressing ozone in air polluted with hydrocarbons and oxides of nitrogen comprising, injecting iodine into the air.

4. The method of suppressing ozone in air polluted with hydrocarbons and oxides of nitrogen comprising, injecting a material selected from the group consisting of iodine, bromine and chlorine into the air.

References Cited in the file of this patent

UNITED STATES PATENTS

| | | |
|---|---|---|
| 2,160,900 | Pleasants | June 6, 1939 |
| 2,665,168 | Kerlin | Jan. 5, 1954 |
| 2,991,014 | Minnick | July 4, 1961 |

OTHER REFERENCES

Journal of Meteorology, volume 8, pages 326–331, an article by C. L. Hosler, "On the Crystallization of Supercooled Clouds," note particularly the Table I on page 328.

Thorpe's Dictionary of Applied Chemistry, Longmans, Green and Company, New York, Fourth Edition, 1946, volume VII, page 2.

Faith: "Nitrogen Oxides," Chemical Engineering Progress, volume 52, Number 8, August 1956, pages 342–344.

Mellor: "A Comprehensive Treatise on Inorganic and Theoretical Chemistry," Longmans, Green and Company, New York, volume 2, 1922, page 17.

Hackh's Chemical Dictionary, The Blakiston Company, Philadeliphia, Third Edition, 1944, pages 144, 193, 425, 445, 446, 533, 688, 867, and 879.